(12) United States Patent
Israelsson et al.

(10) Patent No.: US 10,899,082 B2
(45) Date of Patent: Jan. 26, 2021

(54) INDUCTOR COIL FOR INDUCTION WELDING OF A PACKAGING MATERIAL

(71) Applicant: Tetra Laval Holdings & Finance S.A., Pully (CH)

(72) Inventors: Karl Israelsson, Malmö (SE); Fabio Massaccesi, Modena (IT); Jonas Christoffersson, Vellinge (SE); Emil Johannesson, Malmö (SE); Uwe Dreissigacker, Engelsbrand (DE); Andreas Kraus, Mühlacker (DE); Magnus Råbe, Åkarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/631,608

(22) PCT Filed: Jul. 5, 2018

(86) PCT No.: PCT/EP2018/068224
§ 371 (c)(1),
(2) Date: Jan. 16, 2020

(87) PCT Pub. No.: WO2019/015982
PCT Pub. Date: Jan. 24, 2019

(65) Prior Publication Data
US 2020/0164597 A1 May 28, 2020

(30) Foreign Application Priority Data
Jul. 17, 2017 (EP) .................................... 17181581

(51) Int. Cl.
*H05B 6/10* (2006.01)
*B29C 65/36* (2006.01)
(Continued)

(52) U.S. Cl.
CPC .......... *B29C 65/3668* (2013.01); *B23K 13/01* (2013.01); *B29C 65/32* (2013.01);
(Continued)

(58) Field of Classification Search
CPC ............. B29C 66/0062; B29C 66/1122; B29C 66/4312; B29C 66/71; B29C 66/72321;
(Continued)

(56) References Cited

U.S. PATENT DOCUMENTS 3,721,534 A 3/1973 Kubick
3,808,074 A 4/1974 Smith et al.
(Continued)

FOREIGN PATENT DOCUMENTS

CH 676958 A5 3/1991
CN 102181156 A 9/2011
(Continued)

OTHER PUBLICATIONS

European Search Report in Application No. 17181581.4, dated Jan. 16, 2018, in 7 pages.
(Continued)

*Primary Examiner* — Hung D Nguyen
(74) *Attorney, Agent, or Firm* — Knobbe, Martens, Olson & Bear, LLP (57) ABSTRACT

An inductor coil for induction welding of a packaging material having at least one layer of metal foil is disclosed. The inductor coil can be configured to induce an alternating current in the at least one layer of metal foil for inductive heating of the packaging material. In some embodiments, the inductor coil comprises a base layer material and a top layer material bonded to the base layer material to form an irreversible bonding interface comprising a mixture of the base layer material and the top layer material. An induction sealing device comprising at least one inductor coil and a (Continued)

method of manufacturing an inductor coil for induction welding of a packaging material is also disclosed.

18 Claims, 6 Drawing Sheets

(51) Int. Cl.
  *B23K 13/01* (2006.01)
  *B29C 65/32* (2006.01)
  *B29C 65/00* (2006.01)
  *H01F 5/00* (2006.01)
  *H01F 41/04* (2006.01)
  *H05B 6/36* (2006.01)

(52) U.S. Cl.
  CPC .... *B29C 66/8122* (2013.01); *B29C 66/81427* (2013.01); *H01F 5/00* (2013.01); *H01F 41/04* (2013.01)

(58) Field of Classification Search
  CPC ........ B29C 66/72328; B29C 66/73921; B29C 66/80; B29C 66/8122; B29C 66/8126; B29C 66/81261; B29C 66/81262; B29C 66/81263; B29C 66/81415; B29C 66/81419; B29C 66/81422; B29C 66/81423; B29C 66/81427; B29C 66/81431; B29C 66/81457; B29C 66/81811; B29C 66/81871; B29C 66/8242; B29C 66/832; B29C 66/8322; B29C 66/83221; B29C 66/849; B29C 65/32; B29C 65/3644; B29C 65/3656; B29C 65/3668; B29C 65/368; B29C 65/3684; B29C 65/7451; B23K 13/01; H01F 5/00; H01F 41/04; B29K 2995/0005; B29K 2995/0008; B29K 2905/00; B29K 2905/10; B29K 2905/12; B29K 2905/14
  USPC ....... 219/602, 603, 604, 607, 609, 612–617, 219/633, 672–675, 676
  See application file for complete search history.

(56) References Cited

U.S. PATENT DOCUMENTS

| | | | |
|---|---|---|---|
| 3,864,186 A | 2/1975 | Balla | |
| 4,169,004 A | 9/1979 | Kock et al. | |
| 4,506,125 A | 3/1985 | Smets et al. | |
| 4,704,509 A | 11/1987 | Hilmersson et al. | |
| 4,757,175 A | 7/1988 | Mohr et al. | |
| 4,776,980 A | 10/1988 | Ruffini | |
| 4,808,326 A | 2/1989 | Tanino et al. | |
| 5,200,587 A * | 4/1993 | Fang | H05B 6/105 219/633 |
| 5,250,140 A | 10/1993 | Hayashi et al. | |
| 5,260,535 A * | 11/1993 | Holmstrom | B29C 65/3656 219/604 |
| 5,418,069 A | 5/1995 | Learman | |
| 5,418,811 A | 5/1995 | Ruffini et al. | |
| 5,588,019 A | 12/1996 | Ruffini et al. | |
| 5,649,407 A | 7/1997 | Blomqvist | |
| 5,714,033 A | 2/1998 | Hayashi et al. | |
| 5,889,263 A | 3/1999 | Andersson | |
| 5,968,399 A | 10/1999 | Selberg | |
| 6,167,681 B1 | 1/2001 | Yano et al. | |
| 6,216,420 B1 | 4/2001 | Mazzetto et al. | |
| 6,503,963 B2 | 1/2003 | Toyoda et al. | |
| 6,837,025 B2 | 1/2005 | Kume | |
| 7,002,117 B2 | 2/2006 | Thomasset | |
| 7,003,934 B1 | 2/2006 | Yano | |
| 8,572,936 B2 | 11/2013 | Mancin et al. | |
| 8,839,597 B2 | 9/2014 | Babini et al. | |
| 9,352,869 B2 | 5/2016 | Babini et al. | |
| 9,545,751 B2 | 1/2017 | Hull | |
| 10,414,098 B2 | 9/2019 | Aurand et al. | |
| 2002/0108705 A1 | 8/2002 | Kume et al. | |
| 2004/0045635 A1 | 3/2004 | Bandyopadhyay et al. | |
| 2004/0060928 A1 | 4/2004 | Balla | |
| 2004/0182046 A1 | 9/2004 | Babini et al. | |
| 2006/0124626 A1 | 6/2006 | Kupfer et al. | |
| 2006/0154052 A1 | 7/2006 | Waffenschmidt et al. | |
| 2009/0101286 A1 | 4/2009 | Sumeer et al. | |
| 2010/0025391 A1 | 2/2010 | Palombini et al. | |
| 2010/0155390 A1 | 6/2010 | Hirota | |
| 2010/0180545 A1 | 7/2010 | Palmquist et al. | |
| 2011/0030315 A1 | 2/2011 | Mancin et al. | |
| 2011/0094672 A1 | 4/2011 | Wijk et al. | |
| 2013/0263556 A1 | 10/2013 | Babini et al. | |
| 2016/0221250 A1 * | 8/2016 | Alexandersson ... B29C 66/3462 | |
| 2016/0297121 A1 | 10/2016 | Palmquist et al. | |
| 2017/0240309 A1 | 8/2017 | Rubini et al. | |
| 2018/0272620 A1 | 9/2018 | Persson | |

FOREIGN PATENT DOCUMENTS

| | | |
|---|---|---|
| CN | 105073368 A | 11/2015 |
| EP | 0223517 A2 | 5/1987 |
| EP | 0225392 A2 | 6/1987 |
| EP | 0484998 A1 | 5/1992 |
| EP | 0653899 A2 | 5/1995 |
| EP | 0730946 A2 | 9/1996 |
| EP | 1066951 A2 | 1/2001 |
| EP | 1107358 A2 | 6/2001 |
| EP | 1231149 A1 | 8/2002 |
| EP | 1234771 A1 | 8/2002 |
| EP | 1241098 A1 | 9/2002 |
| EP | 1300340 A1 | 4/2003 |
| EP | 1541641 A | 6/2005 |
| EP | 2008795 A1 | 12/2008 |
| EP | 2236270 A1 | 10/2010 |
| EP | 2468480 A1 | 6/2012 |
| EP | 2781325 A1 | 9/2014 |
| EP | 3000584 A1 | 3/2016 |
| FR | 2776616 A1 | 10/1999 |
| GB | 2506681 A | 4/2014 |
| JP | S57148619 A | 9/1982 |
| JP | S63-187591 A | 8/1988 |
| JP | S63-258729 A | 10/1988 |
| JP | H04-154564 A | 5/1992 |
| JP | H08-244728 A | 9/1996 |
| JP | H09-077006 A | 3/1997 |
| JP | H10-321361 | 12/1998 |
| JP | H11-43115 A | 2/1999 |
| JP | 2004-228043 A | 8/2004 |
| SE | 434240 B | 7/1984 |
| WO | WO 92/015182 A1 | 9/1992 |
| WO | WO 1997/14547 A1 | 4/1997 |
| WO | WO 2001/085827 A3 | 11/2001 |
| WO | WO 2003/053626 A2 | 7/2003 |
| WO | WO 2003/097332 A1 | 11/2003 |
| WO | WO 2005/004560 A1 | 1/2005 |
| WO | WO 2005/105579 A1 | 11/2005 |
| WO | WO 2007/008131 A2 | 1/2007 |
| WO | WO 2012/019925 A1 | 2/2012 |
| WO | WO 2013/045254 A1 | 4/2013 |
| WO | WO 2014/072477 A1 | 5/2014 |
| WO | WO 2014/166765 A1 | 10/2014 |
| WO | WO 2015/036222 A1 | 3/2015 |
| WO | WO 2015/040173 A1 | 3/2015 |
| WO | WO 2015/158502 A1 | 10/2015 |
| WO | WO 2016/083212 A1 | 6/2016 |
| WO | WO 2016/132986 A1 | 8/2016 |
| WO | WO 2017/089186 A1 | 6/2017 |
| WO | WO 2017/089187 A1 | 6/2017 |

OTHER PUBLICATIONS

Search Report and Written Opinion in International Application No. PCT/EP2018/068224, dated Sep. 21, 2018, in 8 pages.

(56) References Cited

OTHER PUBLICATIONS

Davis, J.R.; "Practical Design Guidelines for Surface Engineering" Chapter 8, Surface Engineering for Corrosion and Wear Resistance, ASM International, Mar. 2001; eISBN: 9781615030729, pISBN: 9780871707000; pp. 195-229.
European Search Report for Application No. 16167841.2, dated Nov. 11, 2016.
European Search Report for Application No. 17181917 dated Jan. 23, 2018, in 8 pages.
International Search Report and Written Opinion for Application No. PCT/EP2015/056173, dated Aug. 6, 2015.
International Search Report and Written Opinion for Application No. PCT/EP2015/056329, dated Sep. 5, 2014.
International Search Report and Written Opinion for Application No. PCT/EP2017/060146, dated Jul. 18, 2017.
International Search Report and Written Opinion for Application No. PCT/EP2018/068223, dated Sep. 10, 2018.
International Search Report and Written Opinion for PCT/EP2015/076983, dated Feb. 15, 2016.
International Search Report for Application No. PCT/EP2016/077780 dated Feb. 28, 2017.
International Search Report for Application No. PCT/EP2015/062906, dated Aug. 7, 2015.
International Search Report for Application No. PCT/EP2016/077779 dated Feb. 27, 2017.
Leschynsky et al "Layered Alloys for Effective Magnetic Flux Concentration in Induction Heating," Materials Science—Poland, vol. 25, No. 2, 2007.
Office Action for Swedish Application No. 1551548-9 dated May 30, 2016 in 5 pages.
Office Action in Chinese Application No. 108290352, dated Jan. 24, 2019, in 5 pages.
Office Action in European Application No. 14713137 dated Jun. 26, 2018 in 9 pages.
Office Action in Japanese Application No. 2016-562918, dated Mar. 5, 2019.
Office Action received in Chinese Application No. 201580031130.4 dated Jun. 15, 2018 in 19 pages.
Office Action received in Japanese Application No. 2018-527141, dated Oct. 16, 2018, in 5 pages.
European Search Report received in Application No. 17184954, dated Jan. 22, 2018, in 6 pages.
Search Report and Written Opinion received in International Application No. PCT/EP2018/070595, dated Sep. 21, 2018, in 10 pages.

* cited by examiner

INDUCTOR COIL FOR INDUCTION WELDING OF A PACKAGING MATERIAL

TECHNICAL FIELD

The present invention relates to an inductor coil for induction welding of a packaging material having at least one layer of metal foil. The present invention also relates to an induction sealing device comprising such inductor coil, a sealing machine comprising the induction sealing device, and a related method of manufacturing an inductor coil for induction welding of a packaging material having at least one layer of metal foil.

BACKGROUND

The welding of laminated packing material by means of induction heat is used in the packaging industry. One example of such a laminated material is a carrier layer of paper, aluminium foil and thermoplastic coatings along the inner and outer surfaces of the laminate. The technique of induction welding is based on the fact that the magnetic field around a conductor, generated by an alternating current is capable of inducing a current in an adjoining electrically conducting material, which depending on the resistance of the material, warms up the material. Thus, in induction welding an inductor loop or coil provided against the laminate containing the aluminium foil, and the laminate is pressed together with the material to which it is to be joined. The aluminium foil is heated by means of appropriately chosen current and processing period. The material is heated to a temperature which is high enough to seal adjoining layers of thermoplastic, causing the combined thermoplastic layers to fuse together, thus producing a tight and durable seal.

Typically, the induction sealing device, and accordingly the inductor coil, provided in such sealing process often works in an aggressive environment. The inductor coil may be exposed to high temperatures, high pressures, and chemicals in the sealing machine. This combination creates an aggressive environment which in certain applications causes rapid corrosion and wear of the inductor coil. Consequently, the sealing devices have to be replaced regularly, each replacement causing a stop in the production of packages. Significant resources have to be spent on such maintenance and monitoring of the condition of the induction sealing device. Corrosion and wear may also have impact at an early stage on the sealing process which often is highly optimized, for example by exact impedance matching in the induction heating circuit of the system, in order to accommodate the demands in high-speed sealing production lines. The wear of the inductor may thus counteract such optimization efforts, and further have negative impact on the quality of the sealing in such high-speed systems.

It is desired to improve previous solutions for preventing corrosion and wear, for example by further minimizing the risk of mechanical failure such as cracking of the welding surface of the inductor coil in demanding environments.

Hence, an improved inductor coil would be advantageous and in particular allowing for avoiding more of the above mentioned problems and compromises, including improving the robustness and resistance in aggressive environments such as high-temperature and/or corrosive environments, to increase the lifetime of the inductor coil and facilitate the inductive sealing process optimization in high speed sealing systems. A related induction sealing device and sealing machine comprising such inductor coil would also be advantageous as well as a method of manufacturing such inductor coil for induction welding of a packaging material.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect an inductor coil for induction welding of a packaging material having at least one layer of metal foil is provided. The inductor coil being configured to induce an alternating current in the metal foil for inductive heating of the packaging material. The inductor coil comprises a base layer material, a top layer material bonded to the base layer material to form an irreversible bonding interface comprising a mixture of the base layer material and the top layer material.

According to a second aspect an induction sealing device is provided comprising at least one inductor coil according to the first aspect and a supporting body encapsulating said at least one inductor coil apart from an outer surface of the at least one inductor coil, wherein at least the outer surface comprises a top layer material bonded to a base layer material to form an irreversible bonding interface comprising a mixture of the base layer material and the top layer material.

According to a third aspect a sealing machine for sealing of packaging material is provided. The sealing machine comprises at least one inductor coil according to the first aspect or an induction sealing device according to the second aspect.

According to a fourth aspect a method of manufacturing an inductor coil for induction welding of a packaging material having at least one layer of metal foil is provided. The method comprises bonding a top layer material to a base layer material to form an irreversible bonding interface comprising a mixture of the base layer material and the top layer material, and providing an outer surface of the inductor coil with the top layer material.

Further examples of the invention are defined in the dependent claims, wherein features for the second, third, and fourth aspects of the disclosure are as for the first aspect mutatis mutandis.

Some examples of the disclosure provide for an inductor coil for induction welding of a packaging material that is more robust and resistant in aggressive environments such as high-temperature and/or corrosive environments.

Some examples of the disclosure provide for an inductor coil for induction welding of a packaging material that has an increased lifetime in sealing applications.

Some examples of the disclosure provide for an inductor coil for induction welding of a packaging material that requires less maintenance in sealing applications.

Some examples of the disclosure provide for an inductor coil for induction welding of a packaging material that has a welding surface which is less susceptible to mechanical failure such as cracking in aggressive environments in filling machines.

Some examples of the disclosure provide for an inductor coil for induction welding of a packaging material that has a welding surface which is more easily provided in varying geometries for optimizing the sealing process, while maintaining mechanical stability.

Some examples of the disclosure provide for an inductor coil for induction welding of a packaging material that allows for increased stability in the electrical parameters of the inductive heating circuit applied for the welding.

Some examples of the disclosure provide for an inductor coil for induction welding of a packaging material that allows for improved control of the sealing process.

Some examples of the disclosure provide for more reliable sealing of packaging material containers.

Some examples of the disclosure provide for an increased throughput in an inductive sealing production line.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of, will be apparent and elucidated from the following description of examples of the present invention, reference being made to the accompanying drawings, in which.

DETAILED DESCRIPTION

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

Figure 1:
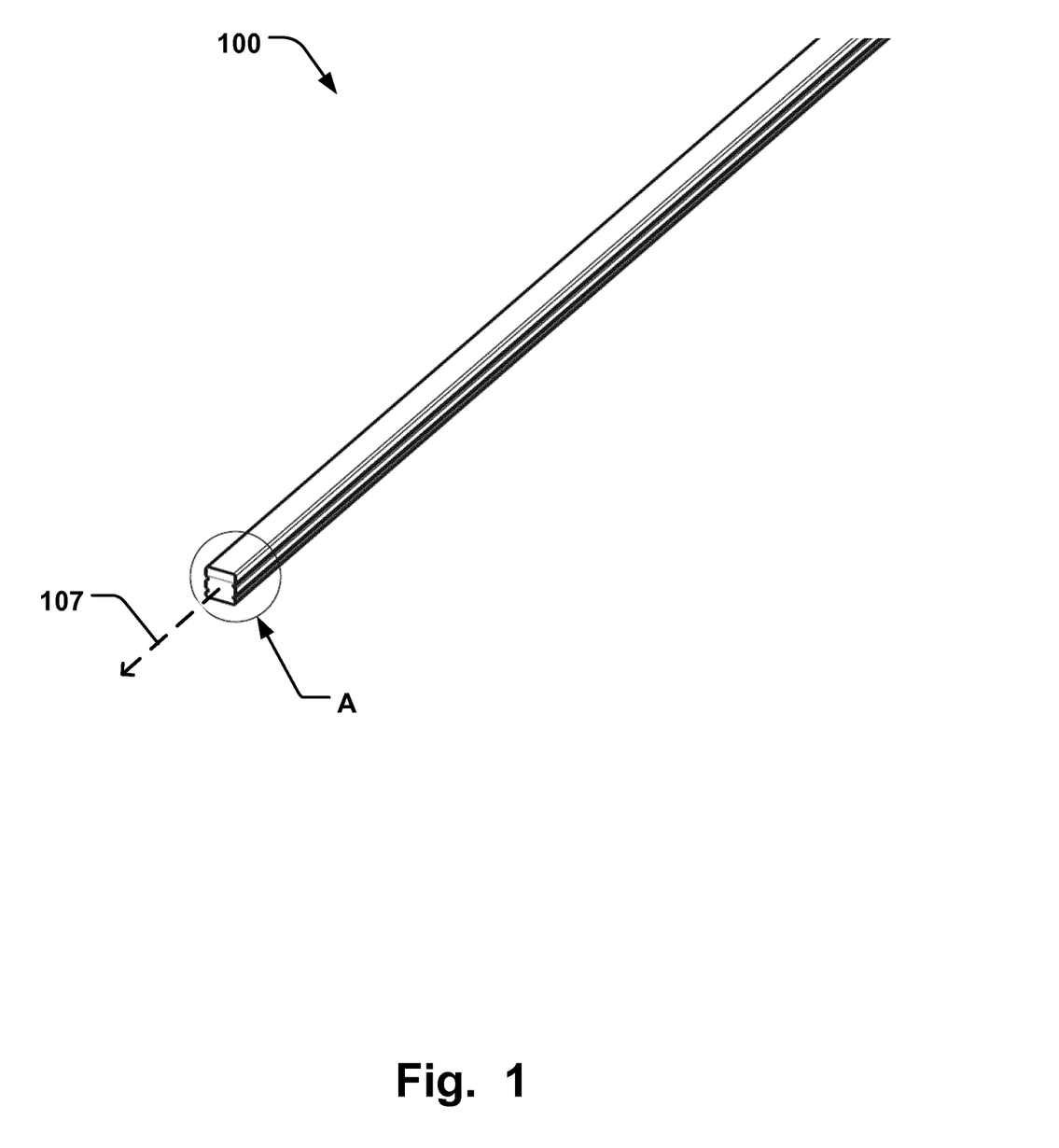
FIG. 1 is a schematic illustration, in a perspective view, of an inductor coil according to an example of the disclosure.
Figure 2:
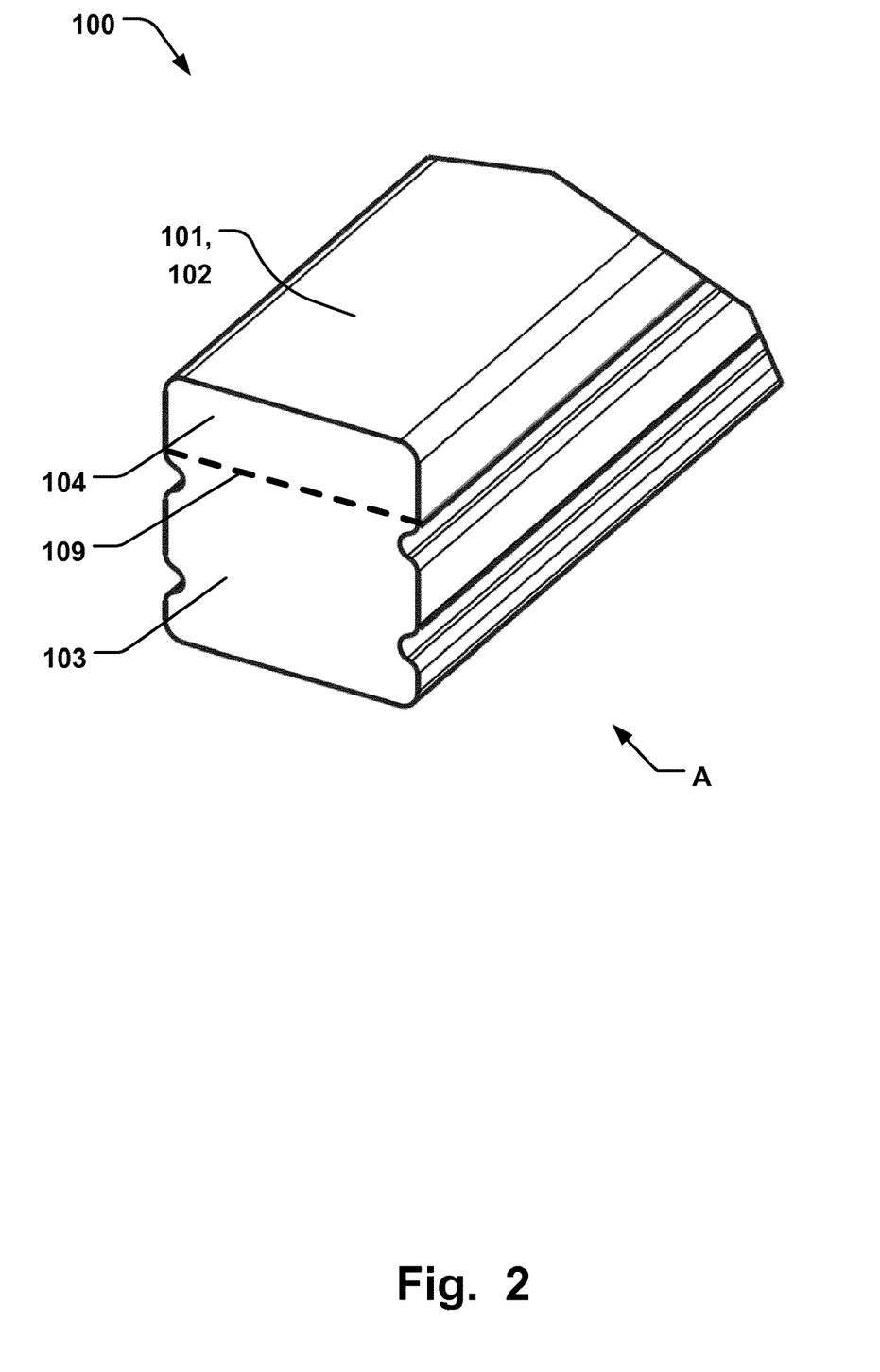
FIG. 2 is a schematic illustration of a detailed section (A) of FIG. 1, in a perspective view, of an inductor coil according to an example of the disclosure.

FIG. 1 is a schematic illustration, in a perspective view, of an inductor coil 100 for induction welding of a packaging material (not shown). The packaging material has at least one layer of metal foil in which an alternating current can be induced. The inductor coil 100 is configured to induce an alternating current in the metal foil for inductive heating of the packaging material. FIG. 2 is a magnified view of a section (A) of the inductor coil 100 in FIG. 1. The inductor coil 100 comprises a base layer material 103 and a top layer material 104. The top layer material 104 is bonded to the base layer material 103 to form an irreversible bonding interface 109 comprising a mixture of the base layer material 103 and the top layer material 104. Such bonded interface 109 between the base layer material 103 and the top layer material 104 provides for a more robust inductor coil with improved integrity of the top layer material 104 in aggressive environments, such as corrosive high-temperature environments, also in combination with mechanical abrasion against the top layer material 104. Having two layers of material 103, 104, provides for optimization to accommodate both the electrical characteristic requirements, by choosing an appropriate base layer material 103, while the top layer 104 material can be optimized to protect the base layer material 103 from the surrounding environment. Having the top layer material 104 bonded so that the interface 109 comprises a mixture of both materials 103, 104, thus provides for the mentioned improvements in the integrity of the layers 103, 104, due to a stronger bonding interface, and improved corrosion protection of the base layer 103. This is particularly advantageous compared to previous techniques where instead a coating is applied on top of the base layer material. Such coating is not bonded to the base layer material as described above, but is rather applied as a superficial layer producing an interface between the materials in which the materials are distinctly separated. This is due to the coating being deposited on top of the base layer without chemical and/or mechanical bonding therebetween, but instead only by means of producing an adhesive effect between the materials. The adhesive effect can typically be achieved for example by having the coating applied by spraying, or otherwise deposited on the base layer material, and subsequently dried or otherwise hardened on top of the base layer material. Thus, by having the material layers 103, 104, bonded the mechanical integrity thereof can be improved, and the risk of failure such as cracking of the top layer 104 can be minimized. The interface 109 comprising a mixture of the materials 103, 104, as a result of the bonding should be construed as the bas- and top layer materials 103, 104, being mixed to overlap at the interface 109 along the vertical direction in e.g. FIG. 3 (i.e. in a direction perpendicular to a plane in which the welding surface 102 of the inductor coil 100 extends). Such bonding of the inductor coil 100 can be achieved by subjecting the materials 103, 104, thereto to a defined pressure and/or temperature so that the materials 103, 104, propagate into each other in the mentioned direction.

The inductor coil 100 accordingly allows for facilitated maintenance in sealing applications and related sealing machines. Furthermore, since the integrity of the top layer material 104 is improved as elucidated above, it is easier to customize the surface of the inductor coil 100 arranged towards the packaging material, i.e. the welding surface, such as for example by shaping the welding surface 102 in different geometries, as seen in e.g. FIG. 5, with a minimized risk of the surface cracking in aggressive environments. E.g. protrusions and/or recesses of the surface may otherwise be more sensitive to failures of the mechanical integrity thereof. The improved abilities to adapt the welding surface, i.e. outer surface 101, thus allows for optimizing the inductor coil 100 to different sealing applications.

The top layer material 104 may be joined to the base layer material 103 by diffusion bonding. Such bonding provides for a strong bonding force between the base- and top layer materials 103, 104, at the bonding interface 109, which will provide for improved mechanical integrity of the base- and top layer materials 103, 104, and a more robust inductor coil 100 in aggressive environments.

The base layer material 103 may have a lower resistivity (p) than the top layer material 104. The base layer material 103 may thus be adapted to provide for the electrical characteristics needed for an optimized induction welding process, while the top layer material 104 is configured for the wear- and corrosion resistance without affecting the desired electrical properties. The inductor coil 100 can thus fulfil the tolerances required, e.g. with respect to impedance characteristics in an inductive heating circuit in a sealing machine and being resistant the aggressive environment therein.

The inductor coil 100 comprises an outer surface 101. At least part of the outer surface 101 may comprise the top layer material 104. The top layer material 104 is thus arranged as a barrier between the surrounding corrosive environment and the base layer material 103. Substantially the entire surface of the inductor coil 100 facing the surrounding medium may comprise the top layer material 104 to further optimize the corrosion resistance, or resistance to outer wear.

In particular, the inductor coil 100 may comprise a welding surface 102 configured to be arranged opposite the packaging material for inductive heating thereof. The welding surface 102 may comprise the top layer material 104. The welding surface 102 is exposed to the surrounding environment in order to interact with the packaging material, and it is thus particularly advantageous to have the welding surface 102 comprising the top layer material 104. Some parts of the outer surface 101 of the inductor coil 100 may not be directly arranged opposite the packaging material, but it may be advantageous for such parts of the outer surface 101 to also comprise the top layer material 104 if being exposed to the surrounding environment. The welding surface 102 may be particularly exposed to mechanical wear such as abrasion etc. The top layer material 104 may improve the resistance to such wear due to the increased mechanical integrity thereof as discussed above.

Figure 3:
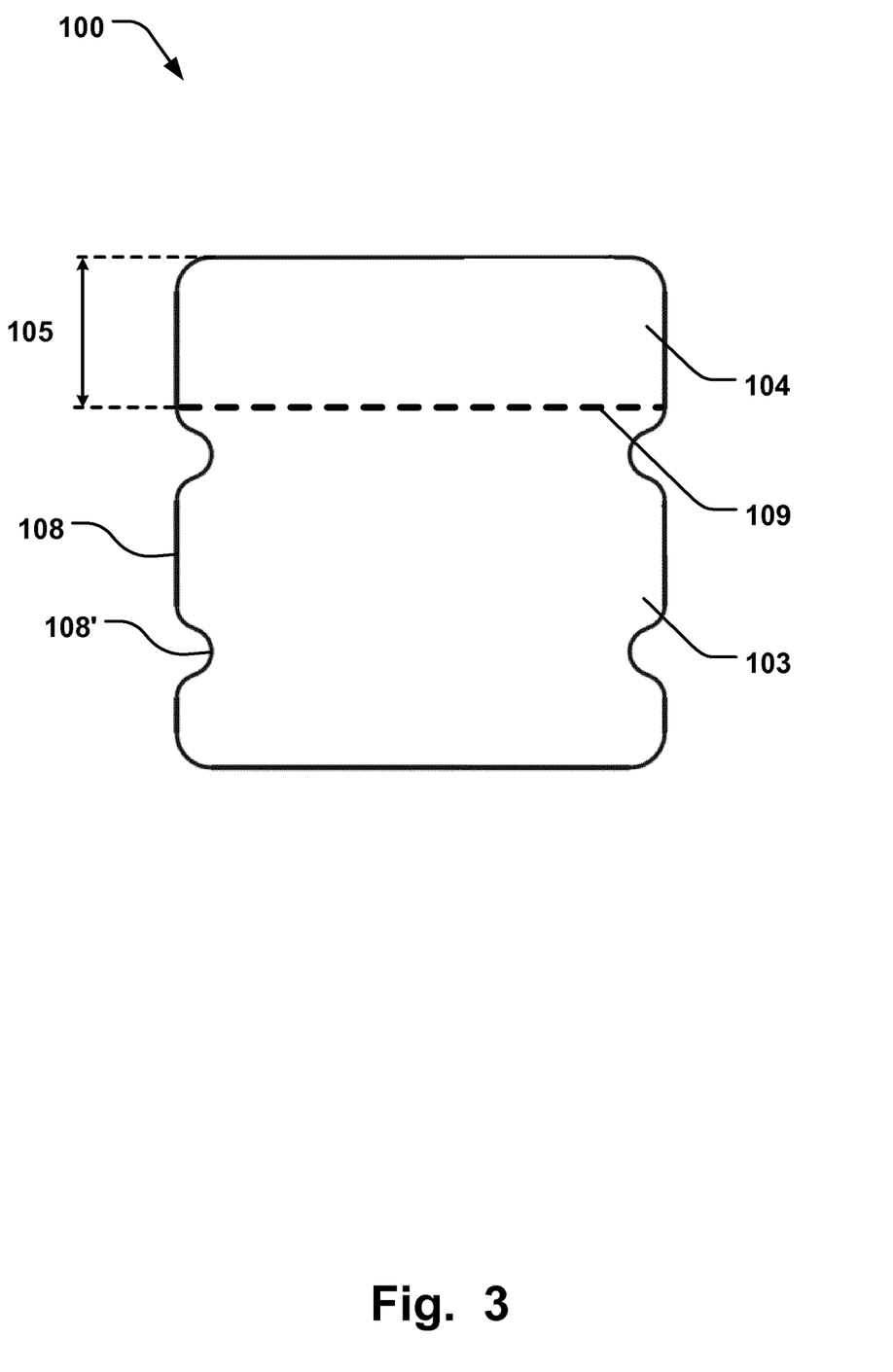
FIG. 3 is a schematic illustration, in a cross-sectional side view, of an inductor coil according to an example of the disclosure.

The top layer 104 may cover the base layer material 103 with a predefined thickness 105. FIG. 3 illustrates an example, in a cross-sectional side view of the inductor coil 100, where the thickness 105 of the top layer material 104 is shown. The thickness 105 may be in the range of 50-150 micrometers. Having a thickness 105 in this range allows for a particularly strong and robust top layer 104 while maintaining the desired functionality of the base layer material 103 in terms of inducing the alternating current in the packaging material. The inductor coil 100 may be elongated and extend with a length in a longitudinal direction 107 as schematically illustrated in the example of FIG. 1. The thickness 105 of the top layer material 104 may be substantially uniform along the length of the inductor coil 100. It is however conceivable that the thickness 105 may be varied along the length. For example, some parts of the inductor coil 100 may be particularly exposed to mechanical wear and a locally increased thickness 105 may improve resistance to e.g. abrasion along such particularly exposed parts.

The top layer material 104 and the base layer material 103 may form a substantially rectangular or square cross-section of the inductor coil 100 along the length 107. FIG. 2 illustrates a magnified view of section (A) in FIG. 1. Having a uniform rectangular or square cross-section of the bonded-together cross-section, as illustrated in FIG. 2, provides for minimizing localized weaknesses along the length of the inductor coil 100, which otherwise may cause cracks in the materials 103, 104.

Figure 5:
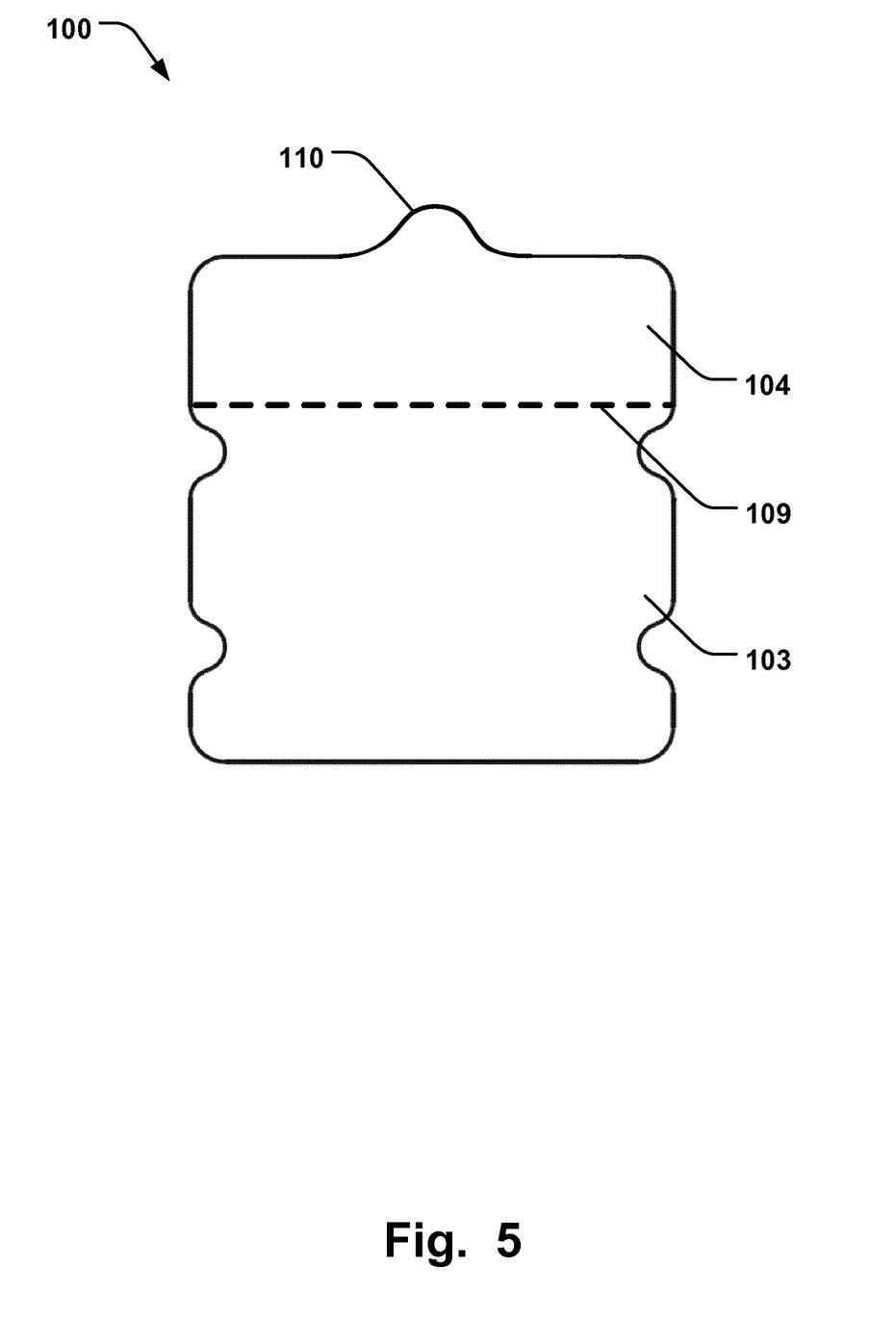
FIG. 5 is a schematic illustration, in a cross-sectional side view, of an inductor coil according to an example of the disclosure.

The inductor coil 100 may comprise a protruding ridge 110 formed from the top layer material 104, as illustrated in the example of FIG. 5. Having the top layer material 104 bonded to the base layer material 103 as described above provides for a more robust surface that can be adapted into varying geometries with a minimized risk cracks in the top layer material 104. Surface structures, such as the protruding ridge 110, may thus be formed with a smaller radius of curvature, i.e. sharper bends in the outline of the surface structure, while not risking cracking of the material in the aggressive environment. Customization to various sealing applications and packaging materials requiring different welding surfaces 102 can thus be facilitated.

The top layer material 104 may comprise a silver-palladium (AgPd) alloy. The AgPd alloy is particularly effective in providing corrosion and wear resistance to the base layer material 103. Substantially the entire outer surface 101, or the welding surface 102, may comprise the AgPd alloy, for an optimized corrosion resistance. It is conceivable however that sufficient corrosion resistance may be achieved if parts or at least the majority of the surface area of the outer surface 101 or the welding surface 102 comprise the AgPd alloy. It is further conceivable that the top layer material 104 may comprise other materials or alloys that provides for an improved corrosion and wear resistance of the base layer material 103. The top layer material 104 may for example comprise any materials, or combination of materials, or various alloys thereof, of the following; Ni, Cr, Ag, Ta, Au, Cu, stainless steel. Other materials or alloys providing for corrosion and/or wear resistance may also be bonded together with the base layer material 103 to provide for the advantageous effects as described above. The materials or combinations of materials, may be provided in different layers of top layer materials 104 being bonded together to form a multi-layered top layer 104. AgPd may in such case be provided at the outer-most layer due to its particularly advantageous chemical and mechanical properties. Having the AgPd bonded together with the base layer material, by e.g. diffusion bonding, provides for a synergistical effect in that the advantageous properties of the AgPd alloy are combined with the strength and robustness of the top layer 104 by the bonding to the base layer material 103 to form the mixture of the mentioned materials at the interface 109. The base layer material 103 may comprise Cu, Al, Ag, Au, or any alloy comprising any of the these or other materials providing for the desired electrical properties of the induction coil 100.

Figure 4:
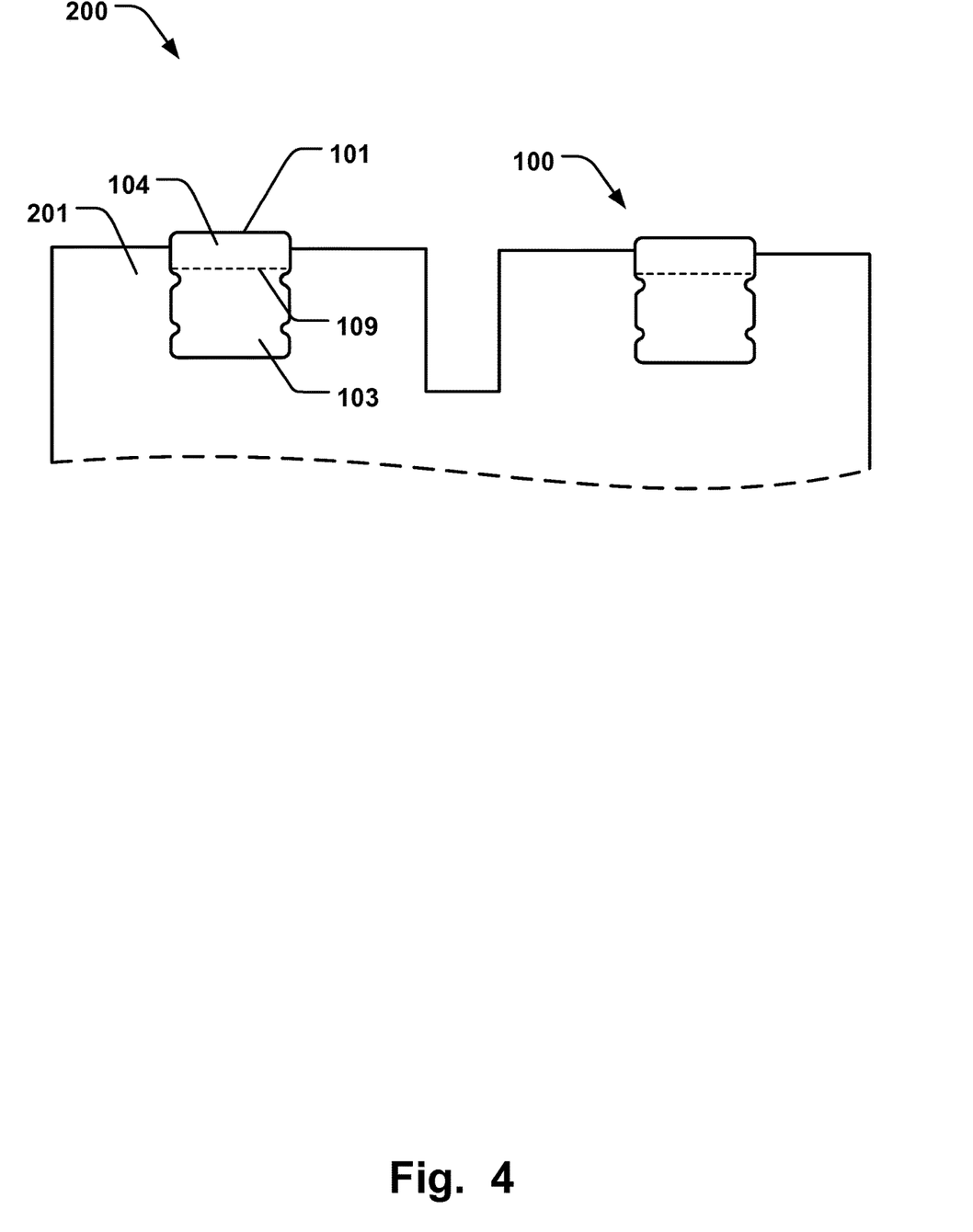
FIG. 4 is a schematic illustration, in a cross-sectional side view, of an induction sealing device, comprising an inductor coil, according to an example of the disclosure.

An induction sealing device 200 is provided comprising at least one inductor coil 100 as described above in relation to FIGS. 1-3 and 5. The induction sealing device 200 comprises a supporting body 201 encapsulating at least one inductor coil 100 apart from an outer surface 101 of the at least one inductor coil 100. FIG. 4 is a schematic illustration of an example of an induction sealing device 200, where a supporting body is arranged around the inductor coil 100, apart from an outer surface 101, effectively being the welding surface 102 of the inductor coil 100. At least the outer surface 101 comprises the top layer material 104 being bonded to the base layer material 103 to form an irreversible bonding interface 109 comprising a mixture of the base layer material 103 and the top layer material 104, as described above. The induction sealing device 200 thus provides for the advantageous effects described above in relation to the inductor coil 100 and FIGS. 1-3 and 5.

The base layer 103 may comprise protrusions or recesses 108, 108', configured to interlock with the supporting body 201. This is illustrated in the detailed side-view of FIG. 3. The positioning of the inductor coil 100 in the supporting body 201 is thus facilitated since the protrusions or recesses 108, 108', may readily interlock with corresponding mating surfaces of the supporting body 201 as seen in FIG. 4. Such locking surfaces may also enhance the stability of the fixation of the inductor coil 100 to the base layer and contribute to the overall robustness of the induction sealing device 200.

A sealing machine (not shown) for sealing of packaging material is provided. The sealing machine comprises at least one inductor coil 100 as described above in relation to FIGS. 1-3 and 5. Accordingly, the sealing machine may also comprise an induction sealing device 200 as described above in relation to FIG. 4. The sealing procedure of packaging material in the sealing machine can thus be improved due to the advantageous effects described above, and in particular allowing for an improved control of the sealing process, a more reliable sealing and ultimately increased throughput in an inductive sealing production line.

Figure 6A:
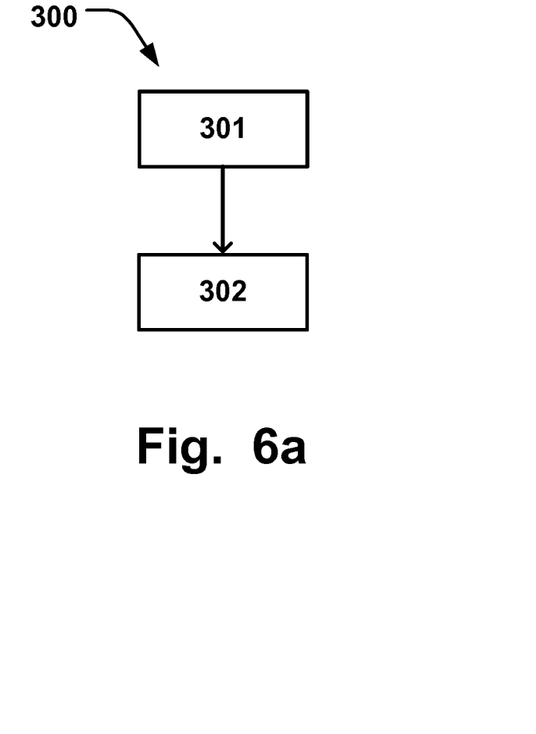
FIGS. 6a-b are flowcharts of a method of manufacturing an inductor coil for induction welding of a packaging material according to examples of the disclosure.

FIG. 6a illustrates a flow chart of a method 300 of manufacturing an inductor coil 100 for induction welding of a packaging material having at least one layer of metal foil. The order in which the steps of the method 300 are described and illustrated should not be construed as limiting and it is conceivable that the steps can be performed in varying order. A method 300 is thus provided, comprising bonding 301 a top layer material 104 to a base layer material 103 to form an irreversible bonding interface 109 comprising a mixture of the base layer material 103 and the top layer material 104. The method 300 further comprises providing 302 an outer surface 101 of the inductor coil 100 with the top layer material 104. The method 300 thus provides for the advantageous benefits as described above in relation to the inductor coil 100 and the induction sealing device 200 in conjunction with FIGS. 1-5.

Figure 6B:
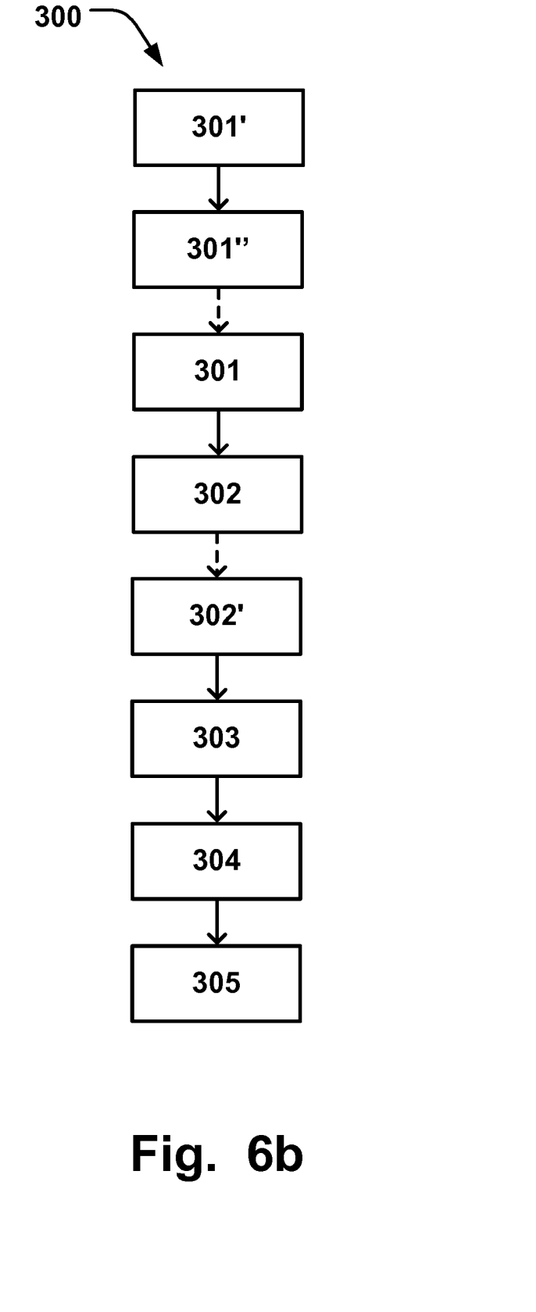

FIG. 6b illustrates a further flow chart of a method 300 of manufacturing an inductor coil 100 for induction welding of a packaging material having at least one layer of metal foil. The order in which the steps of the method 300 are described and illustrated should not be construed as limiting and it is conceivable that the steps can be performed in varying order. The top layer material 104 may be bonded to the base layer material by diffusion bonding 303 as discussed above.

The method 300 may comprise providing 304 a welding surface 102 of the inductor coil with the top layer material 104. The welding surface 102 is configured to be arranged opposite the packaging material for inductive heating thereof. The method 300 may comprise providing 305 the top layer material 104 to extend along the base layer material 103 in a longitudinal direction 107 of the inductor coil 100 with a predefined thickness 105 in the range of 50-150 micrometers.

The method 300 may comprise joining 301' a first portion of material comprising the top layer material 104 to a second portion of material comprising the base layer material 103. The method 300 may comprise applying 301" pressure and/or temperature to the first and second portions of material for the bonding thereof, and forming 302' the inductor coil 100 from the bonded first and second portions of material so that the outer surface 101 of the inductor coil is provided with the top layer material 104. The top layer material 104 may comprise a silver-palladium (AgPd) alloy with the particularly advantageous properties as elucidated above.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. An inductor coil for induction welding of a packaging material having at least one layer of metal foil, the inductor coil configured to induce an alternating current in the at least one layer of metal foil for inductive heating of the packaging material, the inductor coil comprising:
    a base layer material; and
    a top layer material bonded to the base layer material to form an irreversible bonding interface comprising a mixture of the base layer material and the top layer material.

2. The inductor coil according to claim 1, wherein the top layer material is bonded to the base layer material by at least one of brazing, cold or hot cladding, and diffusion bonding.

3. The inductor coil according to claim 1, wherein the base layer material has a lower resistivity (p) than the top layer material.

4. The inductor coil according to claim 1, wherein the inductor coil comprises an outer surface, and wherein at least part of the outer surface comprises the top layer material.

5. The inductor coil according to claim 1, wherein the inductor coil comprises a welding surface configured to be arranged opposite the packaging material for inductive heating thereof, and wherein the welding surface comprises the top layer material.

6. The inductor coil according to claim 1, wherein the top layer material covers the base layer material with a predefined thickness, wherein the predefined thickness is between 50-150 micrometers.

7. The inductor coil according to claim 1, wherein the inductor coil is elongated and extends with a length in a longitudinal direction, and wherein the top layer material and the base layer material form a substantially rectangular or square cross-section of the inductor coil along said length.

8. The inductor coil according to claim 1, further comprising a protruding ridge formed from the top layer material.

9. The inductor coil according to claim 1, wherein the top layer material comprises a silver-palladium (AgPd) alloy.

10. An induction sealing device comprising:
    at least one inductor coil for induction welding of a packaging material having at least one layer of metal foil, the at least one inductor coil configured to induce an alternating current in the at least one layer of metal foil for inductive heating of the packaging material, the at least one inductor coil comprising a base layer material and a top layer material bonded to the base layer material to form an irreversible bonding interface comprising a mixture of the base layer material and the top layer material; and
    a supporting body encapsulating said at least one inductor coil apart from an outer surface of the at least one inductor coil, wherein at least the outer surface of the at least one inductor coil comprises the top layer material bonded to the base layer material.

11. The induction sealing device according to claim 10, wherein the base layer material comprises at least one of protrusions or recesses configured to interlock with the supporting body.

12. A sealing machine for sealing packaging material, the sealing machine comprising:
  at least one inductor coil for induction welding of a packaging material having at least one layer of metal foil, the at least one inductor coil configured to induce an alternating current in the at least one layer of metal foil for inductive heating of the packaging material, the at least one inductor coil comprising a base layer material and a top layer material bonded to the base layer material to form an irreversible bonding interface comprising a mixture of the base layer material and the top layer material.

13. A method of manufacturing an inductor coil for induction welding of a packaging material having at least one layer of metal foil, the method comprising:
  bonding a top layer material to a base layer material to form an irreversible bonding interface comprising a mixture of the base layer material and the top layer material; and
  forming an outer surface of the inductor coil with the top layer material.

14. The method according to claim 13, wherein the step of bonding the top layer material to the base layer material comprises at least one of brazing, cold or hot cladding, and diffusion bonding the top layer material to the base layer material.

15. The method according to claim 13, further comprising:
  forming a welding surface of the inductor coil with the top layer material, the welding surface configured to be arranged opposite the packaging material for inductive heating thereof.

16. The method according to claim 13, further comprising:
  forming the top layer material along the base layer material in a longitudinal direction of the inductor coil with a predefined thickness, wherein the predefined thickness is between 50-150 micrometers.

17. The method according to claim 13, further comprising:
  joining a first portion of material comprising said top layer material to a second portion of material comprising said base layer material;
  applying at least one of pressure and temperature to the first and second portions of material for said bonding thereof; and
  forming said inductor coil from the bonded first and second portions of material so that the outer surface of the inductor coil comprises the top layer material.

18. The method according to claim 13, wherein the top layer material comprises a silver-palladium (AgPd) alloy.

* * * * *